Feb. 18, 1947. W. P. COTTRELL 2,415,993
GYRATORY SCREEN, RUBBER MOUNTED SPRING SUPPORT
Filed March 7, 1945
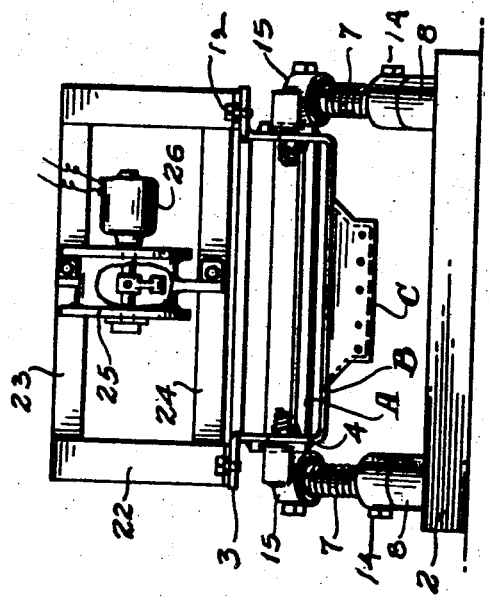
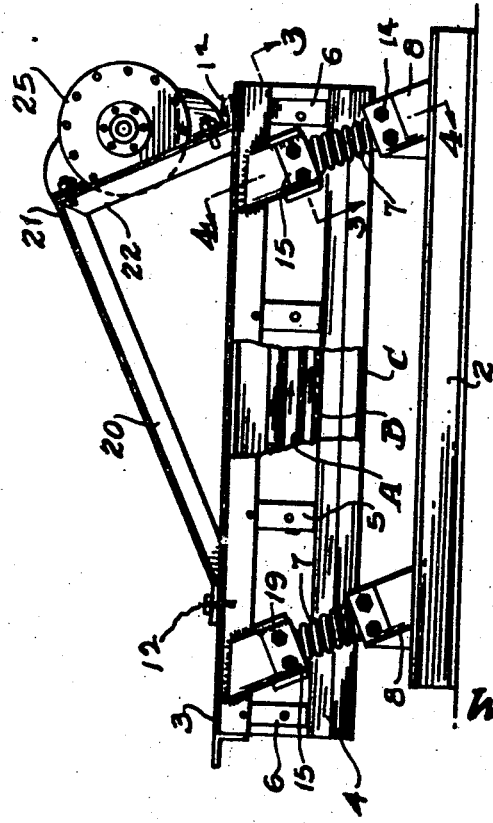
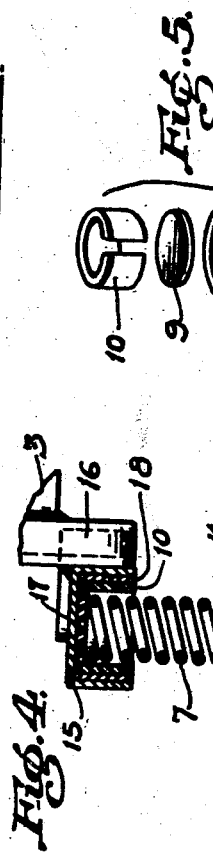
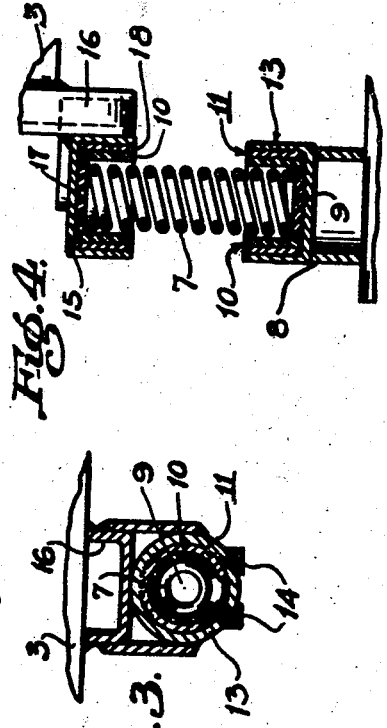
INVENTOR.
WILLIAM P. COTTRELL
BY
ATTORNEY.

Patented Feb. 18, 1947

2,415,993

UNITED STATES PATENT OFFICE 2,415,993

GYRATORY SCREEN, RUBBER MOUNTED SPRING SUPPORT

William Percival Cottrell, Los Angeles, Calif.

Application March 7, 1945, Serial No. 581,441

1 Claim. (Cl. 209—415)

My invention relates to a gyratory screen, rubber mounted spring support or a series of such decks being supported by the same mechanisms. These decks are used for sifting, screening and for what is called panning metal values and for classifications of materials.

The object of my invention is to provide a vibrating deck of simple construction and arrangement, in which particles of material may be efficiently separated.

Reference will be had to the accompanying drawing in which:

Figure 1 is a side elevation of my vibrating deck.

Figure 2 is an elevation of the right end of Figure 1.

Figure 3 is a transverse section on line 3—3 of Figure 1.

Figure 4 is a transverse section on line 4—4 of Figure 1.

Figure 5 shows in perspective fastening details for the vibrating springs used in the construction of the machine.

The base of the machine is primarily composed of the beams 2 forming as it were a floor plan on which the rest of the mechanisms are mounted.

The vibrating main body of the machine is a built-up frame structure having the top longitudinal rails 3 and the lower longitudinal rails 4 and these top rails 3 and the lower rails 4 are tied together by the vertical bars 5 and at their end corners by the vertical bars 6. The frame body thus outlined is supported over the base beams 2 through the means of diagonally arranged coil springs 7, the lower ends of which are mounted in sockets 8 which are metal cups suitably fixed in permanent positions in the beams 2. In the bottom of the sockets 8 there are rubber disks 9, see Figure 5. On the inside of the sockets 8 and above the rubber disks 9 there are rubber packing rings 10 which extend over and around the outside tops and the bottoms of the springs 7. On the outside of the rubber rings 10 there are short split metal sleeves 11 open on one side and embracing the rubber rings 10 and the ends of the coil springs 7. On the top of the coil springs 7 there are rubber disks 17.

The tops of the sockets 8 terminate in integral metal rings 13 which telescope over the split metal rings 11. The metal rings 13 are provided with set screws 14 which when screwed home inwardly clamp the metal rings 11 tightly to the rubber packing rings 10 and firmly to the ends of the coil springs 7, which sustain the springs in their working positions in the machine as relates to their bases in the machine.

The main vibrating body of the machine is mounted on the top of the springs 7 by means of sockets 15 fixed to the top rails 3 in which sockets are elements similar to those shown at the bottom of the springs 7. These sockets 15 are mounted under angle blocks 16 of the side rails 3. On the inside of the sockets 15 there are rubber disks 17 and underneath the angle blocks 16 and around the top of the springs 7 there are split packing rings 10 of rubber of the same type as is indicated for the bottom of the springs 7.

In between the sockets 15 and on the outside of the split rubber rings 10 there are the split clamping rings 18, and these rings 18 are clamped tightly by set screws 19 to clamp the rings 18 tightly to the rubber rings 10 and in turn the rubber rings 10 to the tops of the springs 7 whereby the main vibrating body is supported over its supporting base.

Thus the main vibrating body is supported entirely on the diagonally arranged mounted body of the springs 7. The diagonally arranged mounting of the springs 7 has been the result of extensive research and trial involving a vast amount of expense in arriving at the efficiency of the apparatus, with the result that the angularity of about twenty-five degrees, as is indicated in the drawings, arrives at the best results of service of the machine and is a factor of the novelty of the construction of the apparatus.

The main vibrating body of the machine is provided with a plurality of decks indicated as A, B and C and the number of these decks may be duplicated as desired for any given purpose. The bottom B may be a screen or a catch basin as desired.

The main vibrating body of the machine is provided with the inclined frame bar 20 connected at the right angle corner 21 to an inclined angle bar 22 on the top surface of the main vibrating deck body. This bar 22 is substantially parallel to the twenty-five degree angle incline of the springs 7. The bars 20, 21 and 22 are duplicated on each side and at the right end of the machine, as shown in Figure 1, and the bars 20 are connected by a cross bar 23 at the corners 21 and an additional cross bar 24 extends across at the top of the top rails 3 at the right end of the machine.

Mounted on the bars 22 there is an eccentrically loaded vibrating revolving unit 25 which is revolved by any suitable power means indicated as an electric motor 26 or by any suitable belted pulley drive as may be desired.

The frame indicated by the bars 20, 21, 22, 23 and 24 constitutes an independent frame secured to the top rails 3 by bolts 12 which pass through longitudinal slots in the rails 3 in a manner whereby the said frame may be moved lengthwise and thereby move the vibrating unit 25 to different longitudinal positions on that end of the machine for variations in the adjustments of the action of the eccentric vibrating unit 25 to meet the requirements of different materials which pass through the machine.

This vibrating unit 25, for the best efficiency of the machine, must be located, as shown in the drawings, at one end of the main vibrating body of the machine. The loading of this vibrating unit at that end of the machine contributes to the efficiency of the machine to cause the material to travel across over the deck screen with an efficiency which has not been otherwise obtainable at any other location of the vibrating unit in relation to the vibrating main body of the machine.

Not only that, there is a merit in using coil springs mounted as shown in approximating ratios as to the angularity of the springs with the vertical. Also the twenty five degree angle is a highly desirable approximation for the angle of those coil springs which support the main vibrating body.

The fact that the springs 7 are in coil form and are vibrated rapidly at times to a rate of 2600 revolutions per minute by the eccentric action of the vibrating unit 25 produces an efficiency that has not been heretofore obtainable in machines of this class insofar as my research has discovered.

This may be accounted for to some extent by the fact that when the upper ends of the coil springs 7 vibrate, they are not limited to any particular plane of vibration, and therefore vibrate the whole set of decks in a variety of directions to such an extent that they shake the particles of material one from the other in an infinite number of directions, yet of small amplitude, and in this manner separates the particles from each other with greater efficiency than can be otherwise obtained.

The mounting of the vibrating deck as herein shown, produces an almost infinite variety of short agitations of the materials which are placed upon the screen or screens of my decks which are vibrated as I have indicated. The location of my eccentric rotary vibrating unit fixed as shown in the drawings at one end of the machine causes a more rapid travel toward that end of the machine of the materials which have been placed on the screens of the decks, than has ever taken place with any other location of the said vibrating unit, as has been proven after a great number of test experiments.

It must be borne in mind, I think, that the coil spring legs which control to some extent a peculiar directional vibrating system, each spring vibrating its head in slightly different movements, as one can readily understand, no four of them can be expected to act exactly alike, and there will occur a variation in the shaking of the particles on the screens or screens slightly different in every step which those particles take along the screens as they move toward the discharge end. Further, the fact that the weight of the rotating vibrating unit is loaded on the spring legs of the machine at one end, being the discharge end, causes that end to vibrate with more amplitude than the other end of the machine in every direction in which vibration will take place of the materials on the screen of the decks of the vibrating unit.

The vibrating deck body may, when desired, be supported from the top by the same relatively arranged coil springs on which the vibrating body will be hung by coil springs in tension, instead of being supported by coil springs in compression, as is shown in the drawings herein, and the vibrating unit located in same relative position as to the angularity of the springs and at one end of the machine.

What I claim is:

In an apparatus of the class described, a vibrating deck, a fixed frame to which the said vibrating deck is mounted, coil springs mounted at an angle with the fixed frame and with the vibrating deck, the ends of the said coil springs mounted in metal sockets, rubber bushings enclosing the ends of the said springs within the said sockets, clamping rings enclosing the said rubber bushings and means for clamping the said rings tightly to the said ends of the said coil springs through the medium of the said rubber bushings.

WILLIAM PERCIVAL COTTRELL.

REFERENCES CITED

The following references are of record in the file of this patent:

UNITED STATES PATENTS

| Number | Name | Date |
| --- | --- | --- |
| 1,879,923 | Deister | Sept. 27, 1932 |
| 2,200,724 | Robins | May 14, 1940 |
| 2,246,483 | Dillon | June 17, 1941 |
| 2,140,172 | Royer | Dec. 13, 1938 |
| 2,157,562 | Overstrom | May 9, 1939 |
| 1,036,313 | Ogden | Aug. 20, 1912 |